', 'United States Patent Office 2,979,204
Patented Apr. 11, 1961

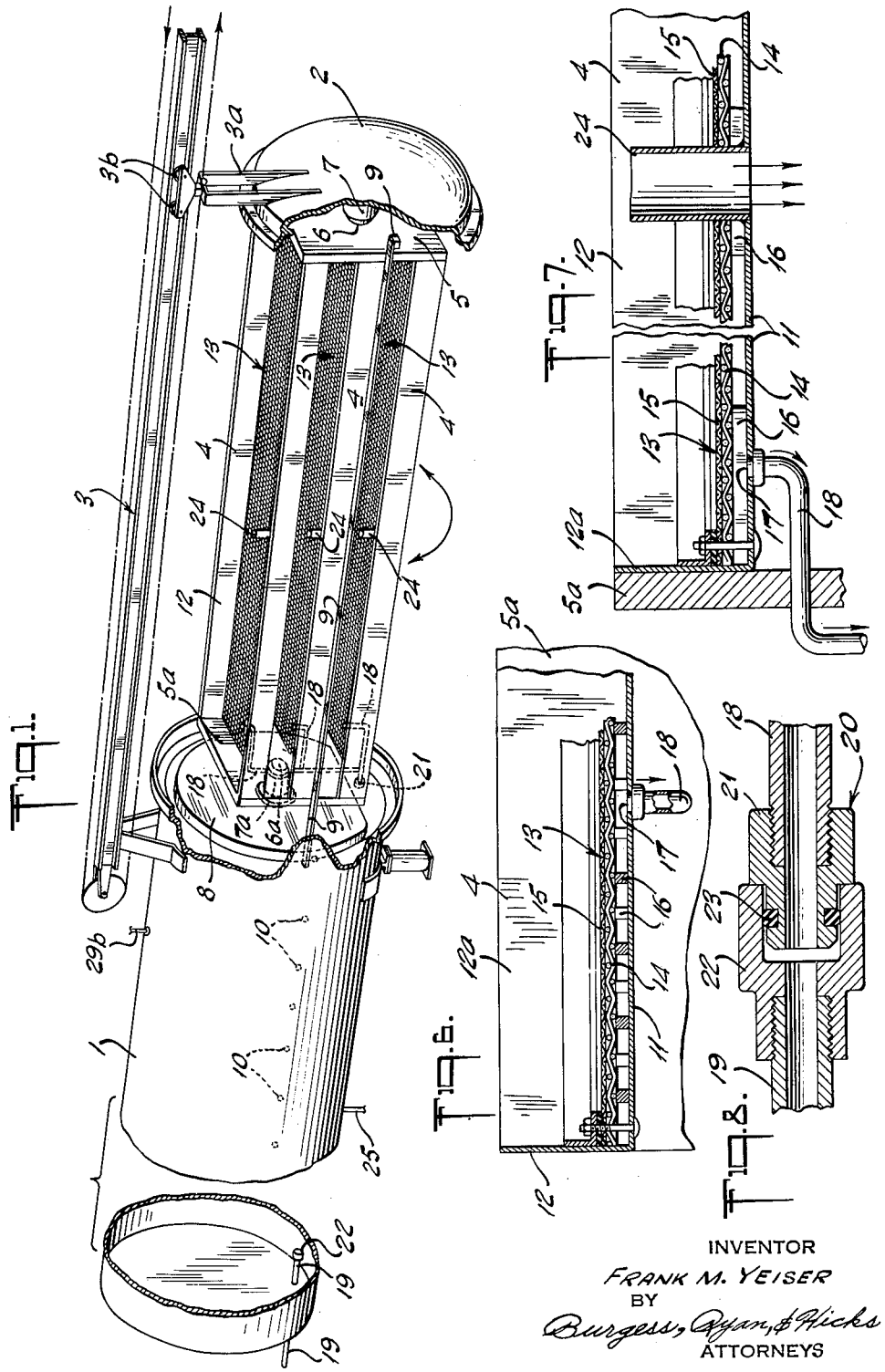

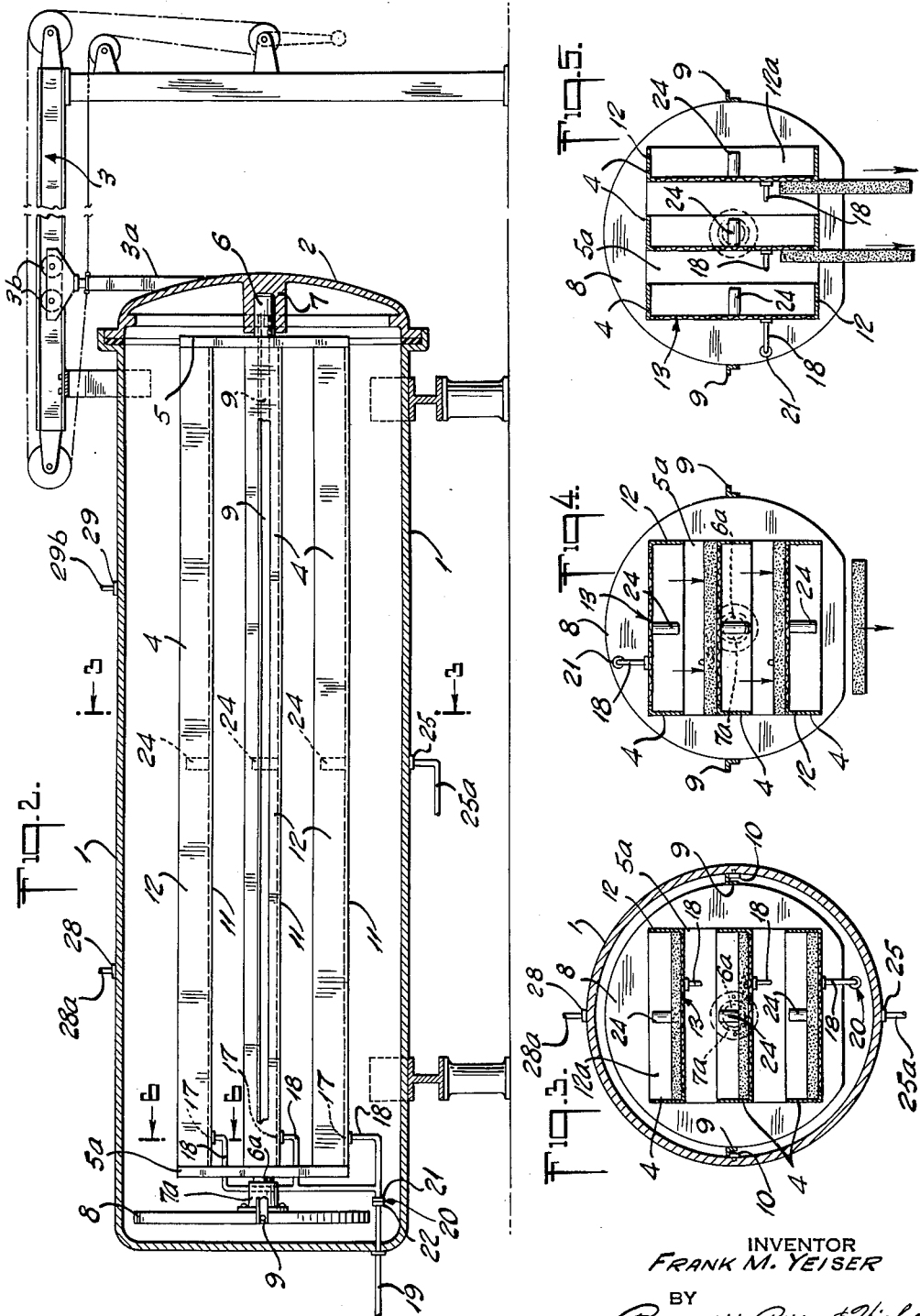

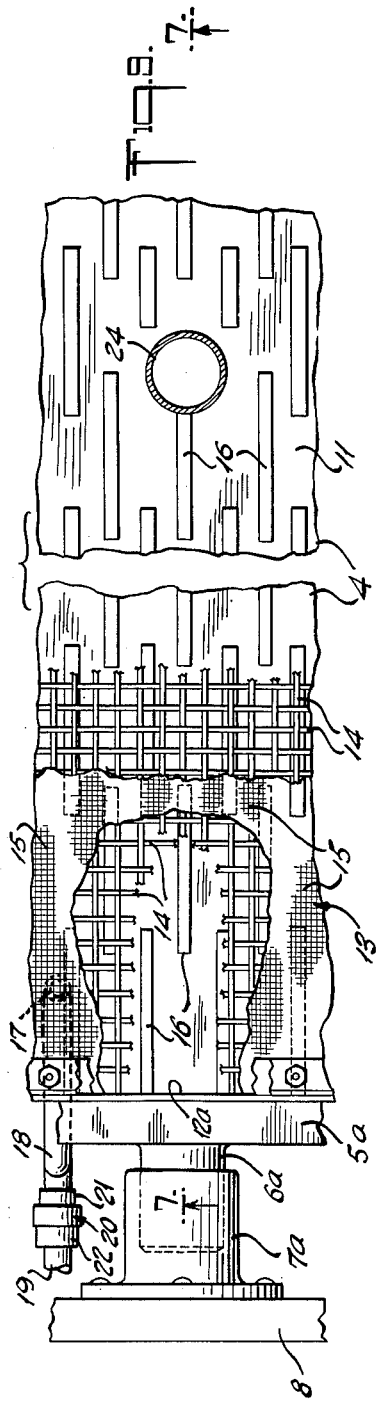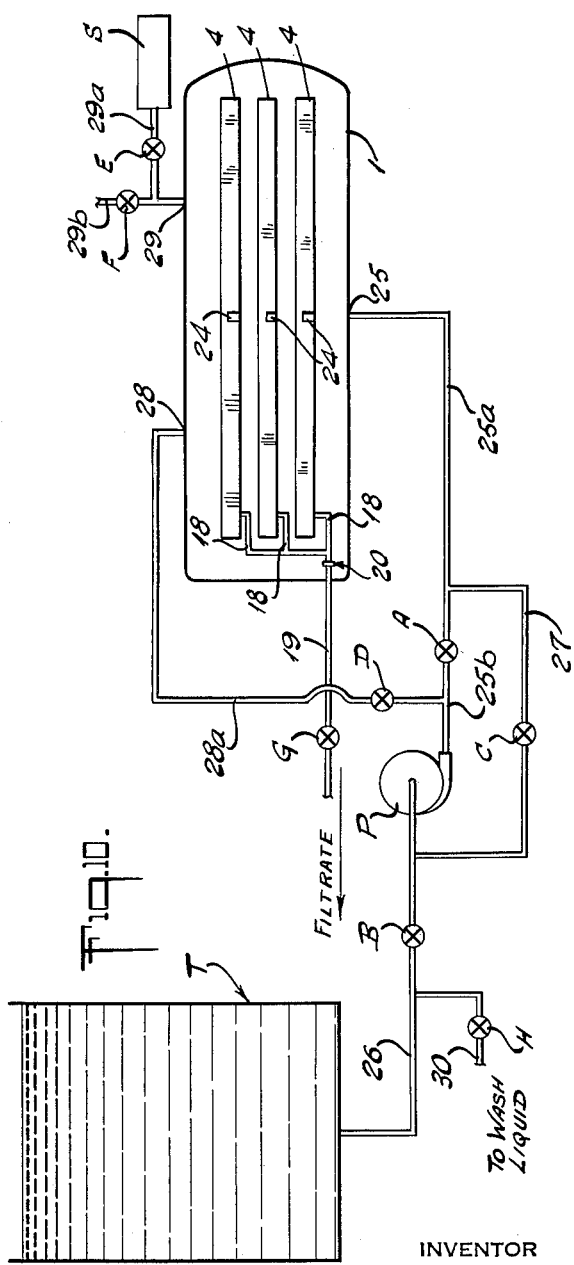

2,979,204

HORIZONTAL LEAF FILTER AND METHOD OF OPERATING THE SAME

Frank M. Yeiser, Morristown, N.J., assignor to T. Shriver & Co., Inc., Harrison, N.J., a corporation of New Jersey Filed Dec. 16, 1958, Ser. No. 780,690

8 Claims. (Cl. 210—65)

The present invention relates to pressure filters and method of operating the same. It relates, more particularly, to a pressure filter having a series of vertically stacked horizontal filter leaves and a method of operating such a filter.

An object of the present invention is to provide a filter having vertically stacked horizontal filter leaves in which liquid may be maintained at a desired level during the operation of the filter and in particular during the washing and finishing cycles. Another object of the invention is to provide a method of operating a pressure filter so as to prevent drying or deterioration of "cake" or material collected on the filter leaves during operation of the filter.

These and other objects and advantages of the invention will be apparent and more clearly understood from the following description and the accompanying drawings in which:

Fig. 1 is a perspective view with certain parts broken away of a filter embodying the invention with the filter leaves removed from the filter vessel;

Fig. 2 is a side view in vertical section of the filter shown in Fig. 1 with the parts of the filter in position for filtering operations;

Fig. 3 is a section view taken along the line 3—3 of Fig. 2;

Figs. 4 and 5 are fragmentary views in transverse section illustrating different positions of the filter leaves in removal of material collected thereon;

Fig. 6 is a fragmentary view in section taken along the line 6—6 of Fig. 2, but on an enlarged scale;

Fig. 7 is a fragmentary view in vertical section taken along the line 7—7 of Fig. 9;

Fig. 8 is a section view of a coupling employed in the filter shown in Fig. 2;

Fig. 9 is a fragmentary plan view of one of the filter leaves with parts thereof being broken away; and Fig. 10 is a diagrammatic illustration of a filtering system employing a filter embodying the present invention.

Referring to the drawings in detail, there is a filter vessel or tank 1 which is supported in a suitable manner in a desired location.

The filter tank 1 illustrated is cylindrical in shape and is closed at one end with an opening at the other end thereof. A removable end plate 2 with suitable sealing gaskets is provided to close the open end of the tank. The removable end plate is suspended by a bracket 3a and wheel 3b from an overhead section of mono-rail track 3 which extends beyond the open end of the tank. As shown in Fig. 1, this arrangement permits the removable end plate and parts of the filter associated therewith to be moved outwardly until they are clear of the tank with a minimum of difficulty.

A filter unit which comprises a series of vertically stacked, horizontal filter leaves or trays 4, is located inside of the tank and is withdrawn from the tank by movement of the end plate away from the tank. The filter unit illustrated employs three trays which are spaced vertically with respect to each other, but it will be understood that the number of trays may be varied. Each of the filter trays which are of similar construction, is attached at its ends to rotatable members or supports 5 and 5a. The rotatable member 5 is located adjacent the removable end plate and carries a shaft 6 which is journalled in a bearing 7 carried on the inside of the end plate 2. The other rotatable member 5a is located adjacent an inner end plate 8 and carries a shaft 6a which is journalled in a bearing 7a carried by the inner end plate. The inner end plate fits inside of the filter tank and is located at the closed end thereof when the filter unit is inserted within the filter tank. When the filter unit is withdrawn from the filter tank as shown in Fig. 1, the filter trays can be rotated to remove the material collected thereon which is commonly known as "cake."

To support the filter unit within the filter tank, rails 9 which are connected to and extend between the end plates 2 and 8 on opposite sides of the filter trays, are provided and the rails rest on rollers 10 on the inside of the filter tank which project inwardly at spaced points along opposite sides thereof. The rails and the rollers support the filter unit and permit it to be readily moved into or out of the filter tank in conjunction with the mono-rail track.

Each of the filter leaves or trays has a closed bottom 11 with upstanding walls 12 and 12a at the sides and ends thereof and a filtering element or screen 13 located therein. The filtering element 13 may be of conventional construction having one or more layers 14 and 15 of wire screen with mesh or openings of a desired size and is supported above the bottom of the tray by spacing members 16. The spacing members are staggered relative to each other so that liquids passing through the filtering element can flow to an outlet 17 in the bottom of the tray at one end thereof.

The outlets from the respective trays are connected to drain pipes 18 which join together and are connected to a common discharge pipe 19 which extends through the closed end of the tank, by means of a disconnectable type of coupling 20. The coupling 20, as shown best in Fig. 8, includes a male member 21 which is carried by one of the pipes 18 and a female member 22 which is carried by the discharge pipe 19. The coupling members are brought into or out of engagement as the filter unit is moved into or out of the filter shell and an O-ring 23 of compressible material forms a seal between the coupling members when they are in engagement.

Each of the filter trays is also provided with a stand pipe 24 (see Fig. 7) which extends upwardly from the bottom of the tray to a desired height above the top of the filtering element and which opens onto the tray immediately below or to the bottom of the tank as the case may be. The stand pipes provide a means for decanting liquid from one tray to another during certain of the filtering operations, as will be hereinafter described, and also permit the same liquid level to be maintained in all of the filter trays during various filtering operations. By maintaining the same liquid level in all of the filter trays, the material or "cake" on the trays will be kept wet during finishing and washing cycles and will not crack or otherwise deteriorate during operation of the filter.

When the desired filtering operations have been completed, the "cake" which has been kept moist can be readily removed from the filter trays by opening the filter and withdrawing the filter unit from the filter tank to a position where the filter trays can be rotated relative to the end plates. By rotating the filter trays through 180°, as shown in Fig. 4, the "cake" from the bottom two filter trays will fall onto the bottoms of the trays which were positioned immediately above them while the "cake" from the topmost tray will fall free. The "cake" resting on the bottoms of the two filter trays can then be removed by rotating the filter trays through 90° (in either direction) so that the bottoms of the filter trays are in a vertical position, as shown in Fig. 5, and the spacing between the filter trays should be such as to accommodate the desired thickness of "cake."

The main filter tank is provided with suitable connections for carrying out the various filtering operations. As illustrated in Fig. 10, there is a connection 25 to the bottom of the tank which is connected through pipes 25*a* and 25*b* and a valve A to the output side of a centrifugal pump P. The input side of the pump is connected through a pipe 26 and a valve B to a tank T containing a supply of the liquid to be filtered. A pipe 27 containing a valve C connects the pipe 25*a* to the input side of the pump.

The output side of the pump is also connected through pipe 25*b* and pipe 28*a* containing a valve D to a connection 28 to the top of the filter tank. A second connection 29 to the top of the tank is connected through a pipe 29*a* and a valve E to a source S of compressed air and is vented to atmosphere through a pipe 29*b* and a valve F.

The discharge pipe 19 is provided with a valve G which controls the flow of the filtrate from the filter tank. For use when the "cake" is to be washed, a supply of wash liquid (not shown) is connected to the input side of the pump through a pipe 30 and a valve H.

In operation of the filter in accordance with the present invention, the liquid from the tank T is pumped into the filter tank through the pipes 25*a*, 25*b*, 25 with the valves A and B being open and with the vent valve F being open. The other valves in the system are closed and remain closed until the filter tank has been filled with the liquid. At this time, the vent valve F is closed and the filtrate valve G is opened. The pressure exerted by the pump will then displace the liquid through the filter screens and the filtrate will pass through the drain pipes and the discharge pipe.

When the supply of liquid in the tank T has been exhausted, valves A and B are closed and valves C and D are opened. Under these conditions, the liquid remaining in the filter tank is circulated by the pump from the bottom connection 25 through pipes 27 and 28*a* to the connection 28 at the top of the tank. The liquid entering through the connection at the top of the tank falls onto the top tray and is decanted through the stand pipes 24 to the tray immediately below or to the bottom of the tank as the case may be. Under these conditions, the pump is operating in a closed circuit and exerts no pressure on the liquid in the filter tank. Hence, compressed air is admitted to the tank through the connection 29 by opening the valve E and supplies the pressure required to force the liquid through the filter screens.

During this operation, which is sometimes called the finishing cycle, the level of the liqud in the filter tank will gradually decrease, but the "cake" in the respective trays will be covered by liquid having a level which is at least equal to the height of the stand pipes until all of the liquid has been drained from the filter tank as such. This insures even "cake" thickness and prevents cracking of the "cake" or the like due to drying. It also prevents loss of air pressure in the filter tank due to cracking of the cake in a tray which has been exposed by displacement of the liquid.

The pump is then shut off and the valves C and D are closed. Continued application of air under pressure to the tank will then displace liquid remaining in the trays through the filter screens and out of the discharge line.

If it is desired to wash the cake to recover soluble values remaining in the "cakes" at the end of the filtering operations, a wash liquor is supplied to the tank by opening the valve H and opening the valves C and D. When the desired quantity of wash liquor has been pumped into the filter tank, the valve H is closed and the wash cycle is then conducted in the same manner as the finishing cycle described above, with the liquid level being maintained in the trays equal to the height of the stand pipes.

It will be understood that various types of filtering operations where it is desirable to maintain the cake in a moist or wet condition can be readily carried out in accordance with the present invention. It will also be understood that various means for decanting liquid from one filter leaf to another may be employed. For example, the filter leaves may be offset vertically with respect to each other so that liquid will flow over the side of one leaf onto the leaf below or the leaves may be of different widths with the narrowest being at the top of the vertical stack.

While a preferred embodiment of the invention and method of operation have been described herein, various changes and modification may be made therein without departing from the scope of the invention as defined by the following claims.

I claim:

1. In a pressure filter, the combination comprising a filter tank having an inlet port for admitting liquid thereto, said port being located in the top of the tank; a series of vertically stacked, horizontal filter leaves located inside said filter tank with an upper leaf located beneath said inlet port, said leaves being supported in spaced relation to each other and having closed bottoms with upstanding side and end walls, said bottoms having outlets connected to a discharge outlet in the tank; and means for maintaining the liquid entering the tank through the inlet port at a predetermined level in each of the leaves of said series of leaves while decanting liquid in excess thereof onto the filter leaf immediately therebeneath.

2. In a pressure filter, the combination as defined in claim 1 which includes end plates located at opposite ends of the filter leaves, said end plates being movably supported with respect to the filter tank, and means for rotatably supporting the filter leaves as a unit on said end plates.

3. In a pressure filter as defined in claim 1 wherein the means for maintaining the liquid level in each of the leaves comprises a stand pipe extending upwardly from the bottom of each of the filter leaves said pipe having one opening above the filter leaf and another opening located beneath said leaf.

4. In a pressure filter, the combination which comprises a filter tank having an inlet port for admitting liquid thereto, said port being located at the top of said tank; a series of vertically stacked horizontal filter leaves located inside said filter tank with an upper leaf located beneath said inlet port, said leaves being supported in spaced relation to each other, each of said leaves having a closed bottom with upstanding side and end walls and a filter element located therein above the bottom, said bottoms having outlets connected to a discharge opening in the tank; and a stand pipe extending from the bottom of each filter leaf to a point above the filter element therein, each of said stand pipes opening onto the filter leaf immediately therebeneath.

5. In a pressure filter, the combination as defined in claim 4, which includes end plates located at opposite ends of the filter leaves, said end plates being movably supported with respect to the filter tank, and means for rotatably supporting the filter leaves as a unit on said end plates.

6. In a pressure filter, the combination which comprises a filter having a liquid inlet at the top thereof, a series of vertically stacked horizontal filter leaves removably supported within said tank, said filter leaves being spaced vertically with respect to each other with the uppermost of said leaves being positioned beneath the liquid inlet in the tank, means for maintaining a predetermined liquid level in each of said leaves and decanting liquid in excess thereof onto the filter leaf immediately therebeneath, and means for rotatably supporting said series of leaves as a unit.

7. The method of operating a pressure filter having a filter tank and a series of vertically stacked filter leaves located therein which comprises the steps of introducing liquid into said tank at a point above a horizontal filter leaf which is uppermost in a series of vertically stacked horizontal filter leaves, maintaining the liquid in the respective leaves at a predetermined level while decanting excess liquid from each of the upper leaves of the stack onto the leaf immediately therebelow until the liquid in the tank has been exhausted and then simultaneously displacing liquid from all of the filter leaves by applying air under pressure to said tank.

8. The method of operating a pressure filter as defined in claim 7 which includes the step of recirculating liquid from the bottom of the tank to the point above the uppermost filter leaf.

References Cited in the file of this patent

UNITED STATES PATENTS 2,843,267 Anderson _____ July 15, 1958